United States Patent
Jia et al.

(10) Patent No.: US 9,755,763 B2
(45) Date of Patent: Sep. 5, 2017

(54) ADAPTIVE POST DIGITAL FILTER AND INTER-SYMBOL INTERFERENCE EQUALIZER FOR OPTICAL COMMUNICATION

(71) Applicant: ZTE Corporation, Shenzhen (CN)

(72) Inventors: Zhensheng Jia, Morganville, NJ (US); Yi Cai, Jackson, NJ (US); Jianjun Yu, Basking Ridge, NJ (US)

(73) Assignee: ZTE Corporation, Shenzhen (CN)

( * ) Notice: Subject to any disclaimer, the term of this patent is extended or adjusted under 35 U.S.C. 154(b) by 24 days.

(21) Appl. No.: 14/800,610

(22) Filed: Jul. 15, 2015

(65) Prior Publication Data

US 2016/0020857 A1    Jan. 21, 2016

Related U.S. Application Data

(60) Provisional application No. 62/025,247, filed on Jul. 16, 2014.

(51) Int. Cl.
  *H04B 10/035* (2013.01)
  *H04B 10/69* (2013.01)
  *H04B 10/2575* (2013.01)
  *H04B 10/61* (2013.01)
  *H04L 25/03* (2006.01)

(52) U.S. Cl.
  CPC ..... *H04B 10/6971* (2013.01); *H04B 10/2575* (2013.01); *H04B 10/61* (2013.01); *H04B 10/616* (2013.01); *H04L 25/03019* (2013.01)

(58) Field of Classification Search
  CPC .... H04L 27/01; H04L 1/004; H04W 72/0453; H04B 10/25; H04B 10/61

USPC .......................................................... 398/208
  See application file for complete search history.

(56) References Cited

U.S. PATENT DOCUMENTS

| | | | |
|---|---|---|---|
| 5,271,042 | A | 12/1993 | Borth et al. |
| 5,809,090 | A | 9/1998 | Buternowsky et al. |
| 5,812,334 | A | 9/1998 | Behrens et al. |
| 6,226,323 | B1 | 5/2001 | Tan et al. |
| 6,490,243 | B1 | 12/2002 | Tanaka et al. |
| 6,842,495 | B1 | 1/2005 | Jaffe et al. |

(Continued)

FOREIGN PATENT DOCUMENTS

| | | |
|---|---|---|
| CN | 1050958 A | 4/1991 |
| CN | 1393066 A | 1/2003 |

(Continued)

OTHER PUBLICATIONS

European Search Report mailed on Dec. 14, 2015 for European Application No. 15275173.1, filed Jul. 13, 2015 (8 pages).

(Continued)

*Primary Examiner* — Don N Vo
(74) *Attorney, Agent, or Firm* — Perkins Coie LLP

(57) ABSTRACT

Modulated optical signals are received in a coherent optical receiver employing both post digital filter and inter-symbol-interference (ISI) equalizer such as a maximum likelihood sequence estimation (MLSE) or Bahl-Cocke-Jelinek-Raviv (BCJR) algorithms. Some disclosed techniques are directed to adaptively adjusting the impulse response in time domain (or equivalently the frequency response in frequency domain) of the post digital filter and the corresponding structure of ISI equalizer in different spectrum-narrowing operation scenarios.

18 Claims, 16 Drawing Sheets

(56) References Cited

U.S. PATENT DOCUMENTS

| | | |
|---|---|---|
| 7,027,537 B1 | 4/2006 | Cheong et al. |
| 7,266,310 B1 | 9/2007 | Savory et al. |
| 8,041,233 B2 | 10/2011 | Hueda et al. |
| 8,156,397 B2 | 4/2012 | Heiman et al. |
| 8,379,709 B2 | 2/2013 | Hui et al. |
| 8,488,726 B2 | 7/2013 | Hueda et al. |
| 8,571,416 B2 | 10/2013 | Grobe |
| 8,649,453 B2 | 2/2014 | Hui et al. |
| 9,329,929 B2 | 5/2016 | Jia et al. |
| 2001/0001616 A1* | 5/2001 | Rakib ............... H03M 13/256 375/259 |
| 2002/0196844 A1* | 12/2002 | Rafie ............... H04L 25/03038 375/232 |
| 2003/0058952 A1* | 3/2003 | Webster ............ H04L 25/0226 375/260 |
| 2005/0177860 A1 | 8/2005 | Goyal et al. |
| 2005/0280568 A1 | 12/2005 | Rowland et al. |
| 2006/0056547 A1 | 3/2006 | Buchali et al. |
| 2006/0274861 A1 | 12/2006 | Langenbach et al. |
| 2008/0199191 A1 | 8/2008 | Essiambre et al. |
| 2009/0092208 A1 | 4/2009 | Montekyo et al. |
| 2009/0110124 A1 | 4/2009 | Fatemi-Ghomi et al. |
| 2009/0177945 A1 | 7/2009 | Djordjevic et al. |
| 2009/0225899 A1 | 9/2009 | Dent |
| 2009/0285278 A1 | 11/2009 | Mamaril et al. |
| 2010/0202504 A1 | 8/2010 | Murali et al. |
| 2012/0068748 A1 | 3/2012 | Stojanovic et al. |
| 2012/0224846 A1 | 9/2012 | Swanson et al. |
| 2013/0138375 A1 | 5/2013 | Zhou et al. |
| 2014/0219666 A1* | 8/2014 | Tselniker ......... H04L 25/03019 398/208 |
| 2014/0233966 A1 | 8/2014 | Yu et al. |
| 2014/0289589 A1 | 9/2014 | Jia et al. |
| 2014/0325319 A1 | 10/2014 | Cai et al. |
| 2016/0105245 A1 | 4/2016 | Cai et al. |

FOREIGN PATENT DOCUMENTS

| | | |
|---|---|---|
| EP | 1 213 852 A1 | 6/2002 |
| WO | 2007/021952 A2 | 2/2007 |

OTHER PUBLICATIONS

European Search Report mailed on Feb. 19, 2016 for European Application No. 15275211.9, filed Oct. 7, 2015 (12 pages).

Fatadin, I., et al., "Carrier Phase Recovery for 16-QAM Using QPSK Partitioning and Sliding Window Averaging," IEEE Photonics Technology Letters, 26(9):854-857, May 2014.

Gao, Y., et al., "Low-Complexity Two-Stage Carrier Phase Estimation for 16-QAM Systems using QPSK Partitioning and Maximum Likelihood Detection," Optical Fiber Communication Conference/National Fiber Optic Engineers Conference 2011, OSA Technical Digest (CD) (Optical Society of America, 2011), paper OMJ6, 3 pages, Mar. 2011.

Hui, D., et al., "Maximum Likelihood Sequence Estimation in the Presence of Constant Envelope Interference," IEEE 58th Vehicular Technology Conference, 2003 (VTC 2003—Fall), vol. 2, pp. 1060-1064, Oct. 2003.

Lobanov, S., et al., "Influence of non-Gaussian statistics in Duobinary Transmission," 2006 Conference on Lasers and Electro-Optics and 2006 Quantum Electronics and Laser Science Conference, Long Beach, California, paper CThY6, pp. 1-2, May 2006.

Cai, Y., et al., "On turbo Code Decoder Performance in Optical-Fiber Communication Systems With Dominating ASE noise," Journal of Lightwave Technology, 21(3):727-734, Mar. 2003.

Djordjevic, I.B., et al., "Achievable Information Rates for High-Speed Long-Haul Optical Transmission," Journal of Lightwave Technology, 23(11):3755-3763, Nov. 2005.

Djordjevic, I.B., et al., "Suppression of Fiber Nonlinearities and PMD in Coded-Modulation Schemes With Coherent Detection by Using Turbo Equalization," Journal of Optical Communications and Networking, 1(6):555-564, Nov. 2009.

European Search Report mailed on Aug. 26, 2014 for European Application No. 14160741.6, filed Mar. 19, 2014 (5 pages).

Forney, G.D., Jr., "Maximum-Likelihood Sequence Estimation of Digital Sequences in the Presence of Intersymbol Interference," IEEE Transactions on Information Theory, IT-18(3):363-378, May 1972.

Jia, Z., et al., "Experimental demonstration of iterative post-equalization algorithm for 37.5-Gbaud PM-16QAM quad-carrier Terabit superchannel," Optics Express, 23(3):2157-2162, Feb. 2015.

Chinese Office Action mailed on Nov. 15, 2016 for Chinese Application No. 201410104337.7, filed Mar. 20, 2014 (6 pages).

Chinese Office Action mailed on Nov. 28, 2016 for Chinese Application No. 201410103677.8, filed Mar. 20, 2014 (12 pages).

Fahmy, S.A., "Histogram-Based Probability Density Function Estimation on FPGAs," 2010 International Conference on Field-Programmable Technology, pp. 449-453, (2010).

* cited by examiner

ADAPTIVE POST DIGITAL FILTER AND INTER-SYMBOL INTERFERENCE EQUALIZER FOR OPTICAL COMMUNICATION

CROSS REFERENCE TO RELATED APPLICATIONS

This patent document claims the benefit of priority of U.S. Provisional Patent Application No. 62/025,247, filed on Jul. 16, 2014. The entire content of the before-mentioned patent application is incorporated by reference as part of the disclosure of this document.

TECHNICAL FIELD

This patent document relates to optical signal reception and processing.

BACKGROUND

There is an ever-growing demand for data communication in application areas such as wireless communication, fiber optic communication and so on. The bandwidth demand on core networks is especially higher because not only are user devices such as smartphones and computers using more and more bandwidth due to multimedia applications, but also the total number of devices for which data is carried over core networks is increasing.

SUMMARY

In some disclosed embodiments, techniques of receiving and processing modulated signals to recover data modulated on to the signals are disclosed. In some embodiments, a post digital filter with adaptive coefficients is used to compensate for distortions in the received signals caused by channel conditions that change over time and result in narrow-band filtering of the modulated signal, thus causing inter-symbol interference (ISI). The output of the adaptive digital post-filter may be processed through an ISI equalizer, which may be used to provide a feedback signal that is used for changing the filter coefficient values of the adaptive post filter.

In one example aspect, a method of recovering information bits from a modulated signal is disclosed. The modulated signal may have information bits modulated using a coherent modulation technique. The method includes receiving the modulated signal in an analog format, converting the modulated signal in the analog format into a digitized signal, estimating, by processing the digitized signal, a channel impairment in the modulated signal and a modulation carrier used for the coherent modulation technique, filtering the processed digitized signal operation using a finite impulse response digital post-filter comprising a number of filter coefficients to generate a filter output, and performing inter-symbol-interference (ISI) equalization on the filter output to produce estimates of the information bits.

In another example aspect, an optical receiver apparatus is disclosed for recovering data bits modulated on a coherent carrier in an optical communication system is disclosed. The apparatus includes a radio frequency front end that receives the modulated signal in an analog format, an analog-to-digital convertor that converts the modulated signal in the analog format into a digitized signal, an estimator that estimates, by processing the digitized signal, a channel impairment in the modulated signal and a modulation carrier used for the coherent modulation technique, a filter that filters the processed digitized signal operation using a finite impulse response digital post-filter comprising a number of filter coefficients to generate a filter output, and an inter-symbol-interference (ISI) equalizer that performs equalization on the filter output to produce estimates of the information bits.

In yet another example aspect, an optical communication system that includes an optical signal transmitter, an optical transmission network and an optical signal receiver is disclosed. The optical signal transmitter produces an optical signal in an analog format comprising information bits using a coherent modulation technique. The optical transmission network carries the optical signal. The optical signal receives, via the optical transmission network, the modulated signal in the analog format, converts the modulated signal in the analog format into a digitized signal, estimates, by processing the digitized signal, a channel impairment in the modulated signal and a modulation carrier used for the coherent modulation technique, filters the processed digitized signal operation using a finite impulse response digital post-filter comprising a number of filter coefficients to generate a filter output, and performs inter-symbol-interference (ISI) equalization on the filter output to produce estimates of the information bits.

DETAILED DESCRIPTION

With the recent growth in demand on bandwidth carried over communication networks, network operators, service providers and equipment vendors have been looking for ways in which to increase network throughput using the existing network infrastructure. At the core of a communication network, data from multiple users is often aggregated and carried over optical transmission medium. Advances in optical transmission and reception techniques could therefore benefit not just the core network, but the total end-to-end user experience in today's communication networks such as mobile (cellular), cable modem and other networks.

The techniques described in the present document can be used, among other uses, to more accurately receive (e.g., with reduced bit error rate) modulated data from a transmitted signal compared to conventional methods. In another aspect, the techniques can be used to increase the signal to noise ratio margin of transmitted data, thereby possibly increasing the amount of data that can be transmitted on a per Hertz per second basis.

Figure 13:
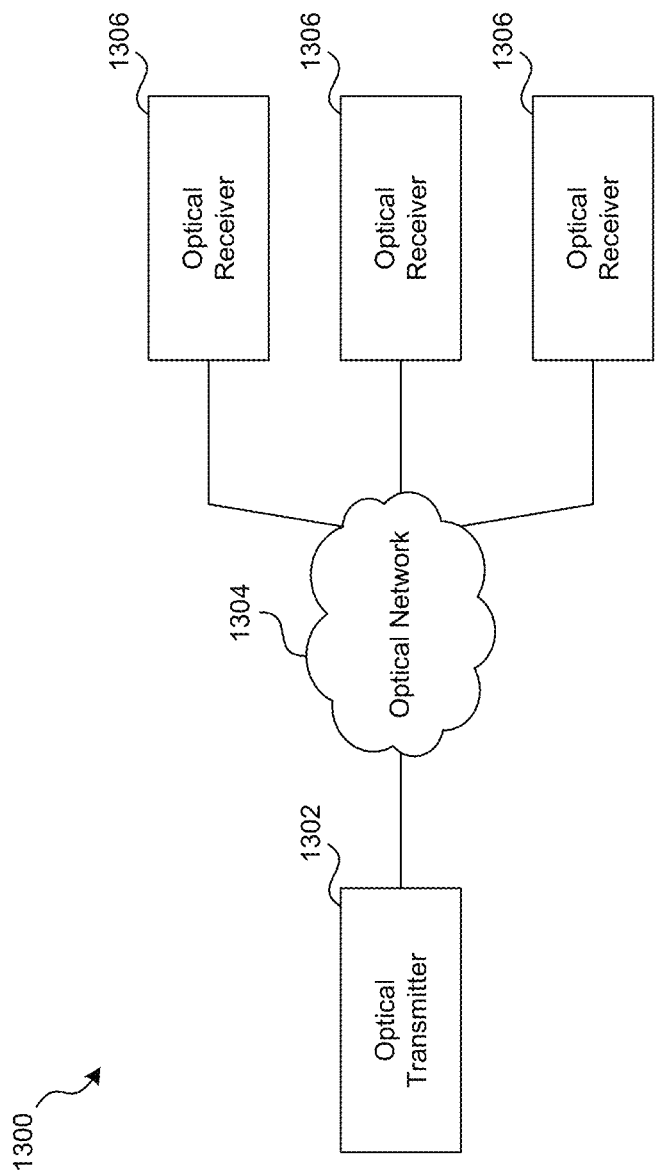
FIG. 13 is an example of an optical communication system.

FIG. 13 depicts an optical communication system 1300 in which the presently disclosed technology can be practiced. One or more optical transmitters 1302 are communicatively coupled via an optical network 1304 with one or more optical receivers 1306. The optical network 1304 may comprise optical fibers that extend in length from several hundred feet (e.g., last mile drop) to several thousands of kilometers (long haul networks). The transmitted optical signals may go through intermediate optical equipment such as amplifiers, repeaters, switch, reconfigurable optical add-drop multiplexing (ROADM), etc., which are not shown in FIG. 13 for clarity. The techniques described herein can be implemented in the receiver-side electronics of the optical apparatus 1302, 1306.

Optical reception techniques based on coherent detection and digital signal processing (DSP) have established their indispensable roles in ultra-high speed optical transport to improve the receiver sensitivity and achieve superior channel equalization of signal impairments. Increasing spectral efficiency (SE) and the flexible configuration of optical switching are the major facilitators in developing high-speed optical transport networks. To enhance the spectral efficiency (SE) and thus the total channel capacity, pulse shaping, or narrowband prefiltering, have been demonstrated to be an effective way by reaching super-Nyquist bandwidth. In these implementations, the channel spacing is typically set to be smaller than the baud rate (Nyquist bandwidth).

Similarly, a reconfigurable optical add-drop multiplexing (ROADM) can narrow the optical signal bandwidth due to spectral truncation after passing multiple wavelength-selective switch (WSS) based optical nodes.

In any of these cases, the ISI impairment can be compensated to achieve acceptable performance. Schemes using post digital filter and the subsequent multi-symbol detection algorithms, such as maximum likelihood sequence estimation (MLSE) or Bahl, Cocke, Jelinek and Raviv (BCJR), which is an algorithm for maximum a posteriori decoding of error correcting codes defined on trellises, have been demonstrated for effective noise suppression and equalization of ISI impairment. These schemes, however, lack the adaptive capability for the maximum gain that the schemes can obtain in many different operation scenarios. In one advantageous aspect, the techniques disclosed in the present document can be used to achieve the maximal benefit in different spectrum-narrowing operation scenarios, by adaptively adjusting a post digital filter using a subsequent multi-symbol detection scheme to optimize the matched filter function to improve the overall system performance.

In a typical digital optical coherent receiver, a least-mean-square (LMS) algorithm such as constant modulus algorithm (CMA) or decision-directive LMS algorithm is commonly used in an adaptive manner. A butterfly equalizer structure is also typically used for the implementation. These linear equalizers offer good performance on the channels with well-behaved spectral characteristics to compensate the major linear transmission impairments. When the signal passes through a bandwidth-limited channel, the signal typically undergoes ISI impairment. The full-response equalizer is expected to exhibit a frequency response roughly inverse to the channel frequency response, which means the attenuation of certain spectral components will translate to the gain of the linear equalizer on the same spectral components. However, in-band noise on the same spectral component is also amplified with the signal. As a result of that, the noise is enhanced and the SNR of signal decreases.

In case of such bandwidth-limited transmissions, a DSP can utilize finite-impulse-response (FIR) post digital filters and multi-symbol detection algorithms to suppress enhanced noise and to compensate the ISI distortions. Besides the typical DSP flow, the post digital filter, in some embodiments, is added after the carrier frequency and phase recovery. A function of the post filter is to suppress the enhanced noise by other equalization process before it, hence leading to a significant signal-to-noise ratio improvement. The introduced ISI is individually equalized to each of four orthogonal components by a multi-symbol detection scheme that bases its decisions on observation of a sequence of received signals over successive signal intervals.

A commonly applied FIR filter has simple structure, such as only 2 or 3 taps with certain value tap coefficient, to suppress the enhanced noise with the followed corresponding MLSE or BCJR for multi-symbol detection algorithms. In practical transmission systems, however, the input signal of this post digital filter and multi-symbol detection scheme may have different degree of ISI impairment in different operation situations and the ISI impairment may also change for different channel conditions such as the change of number of ROADM nodes after protection and restoration action. Hence, to fully utilize the capability provided by this scheme, it is important for the post digital filter and the corresponding ISI equalizer to have accurate prior knowledge about the ISI impairment condition and thus the matched filter function for the optimal noise suppression. Since channel bandwidth during actual operations may dynamically change, an effective technique should adaptively track or estimate bandwidth utilization to achieve an optimal SNR performance.

In a coherent optical receiver employing both post digital filter and an ISI equalizer, the ISI equalizer may change values of equalizer parameters based on the impulse response of the post digital filter. When the impulse response of post digital filter approaches the matched filter of the entire channel link, the SNR typically reaches its optimal value for the severe ISI impairment in the case of spectrum-narrowing channel. This scheme, however, will bring penalty for certain operation condition when the impulse response of post digital filter is away from its matched filter of the link. One reason is the imbalance between the equalization of ISI impairment and enhanced high-frequency noise components.

The present document discloses techniques, among others, for receiving modulated optical signals in a coherent optical receiver employing both post digital filter and inter-symbol-interference (ISI) equalizer such as a maximum likelihood sequence estimation (MLSE) or Bahl-Cocke-Jelinek-Raviv (BCJR) algorithms. Some disclosed embodiments are directed to adaptively adjust the impulse response in time domain (or equivalently the frequency response in frequency domain) of the post digital filter and the corresponding structure of ISI equalizer in different spectrum-narrowing operation scenarios.

The adjustment of post digital filter provides, among other things, a matched filter function for optimization of noise suppression and the subsequent ISI equalizer realizes optimal detection towards the filter introduced symbol correlation to increase the system margin for the optical signal to noise ratio (ROSNR).

In another advantageous aspect, some embodiments can adaptively optimize the impulse or frequency response of the post digital filter and the corresponding ISI equalizer based on different bandwidth limitation level of the transmission link. In some implementations. In various implementations, an optical receiving method can take either soft or hard values output from the ISI equalizer module, evaluate the output signal performance of the equalized effect, and then adaptively provide the adjustment information of the impulse or frequency response of the digital filter and the change of ISI equalizer to the corresponding module for optimization of equalization performance. The implementation continues to get feedback from the equalized signals to further improve the accuracy of the adjusted filter shape and the following ISI equalizer. The performance evaluation can be based on the calculation of the error vector magnitude (EVM), standard deviation or the number of statistical sample within certain region of the soft values, or bit error rate (BER) of the hard values from the output of ISI equalizer. The methods described here may be applied in optical communication system with spectral narrowing impairment and other systems that use post-digital filter and ISI equalizer schemes. The disclosed techniques are also applicable to other communication networks, e.g., coaxial, wireless or phone line networks, in which transmitted signals are low pass filtered during transmission, thereby introducing ISI.

Figure 1:
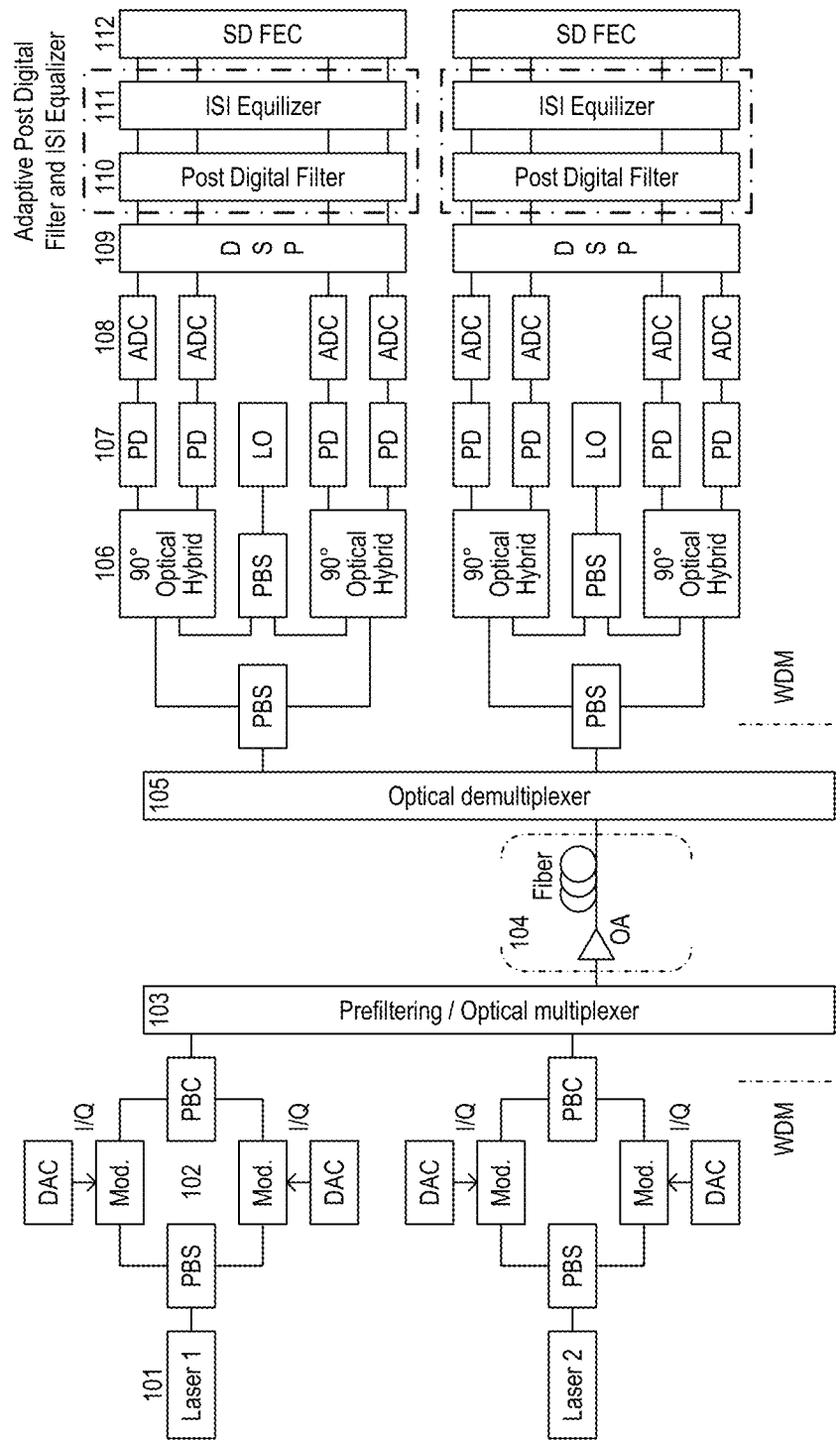
FIG. 1 is a block diagram of an example of a pre-filtering wavelength division multiplexing (WDM) transmission system with coherent detection employing both post digital filter and an ISI equalizer DSP (digital signal processing) module.

An example of a prefiltering WDM (wavelength division multiplexing) transmission system with coherent detection is shown in FIG. 1 as an example embodiment. The lightwave generated laser (101) is split by a polarization beam splitter (PBS) and individually modulated by a QPSK optical modulator, and then combined with a polarization beam combiner (PBC) to realize polarization multiplexed QPSK modulation (102). The input driven signals are generated through digital-to-analog converter. Then, optical multiplexer (103) with narrow-band optical filtering function is used to perform aggressive spectrum shaping and multiplexing function to obtain prefiltered signal, such as sub-Nyquist (symbol bandwidth>channel spacing), Nyquist (symbol bandwidth=channel spacing), or faster-than Nyquist WDM signals (symbol bandwidth<channel spacing). One of the implementations of such prefiltered systems is based on regular optical filter, such as wavelength selective switch (WSS). The optical filter can also perform the optical multiplexing function simultaneously. Another realization is based on a DAC (digital to analog converter) at the transmitter in digital field. In-phase and quadrature-phase components of an optical carrier are modulated in a single IQ modulator driven by two independent electric pulse-shaped signals. Inventors' simulations and experiments have shown that these two technologies potentially reach the same sensitivity performance with the ideal filter shape.

The transmission link (104) is uncompensated for chromatic dispersion (CD) and consisting of optical amplifier (OA) and fiber at each span. After transmission, the optical demultiplexer (105) is used to demultiplex the WDM channels to the coherent detection.

At the receiver side, local oscillator (LO) signal after PBS may be launched into the 90° optical hybrid (106) to perform polarization splitting of incoming transmitted signal. The diversified (split) signals are sent to a photodiode (PD) (107) and digitally sampled with analog-to-digital converter (ADC) (108). A regular digital signal processing unit (109) may then follow to compensate the optical front end (106 and 107) distortion, and then to equalize the static and dynamic linear impairments, timing and carrier recovery.

Figure 2:
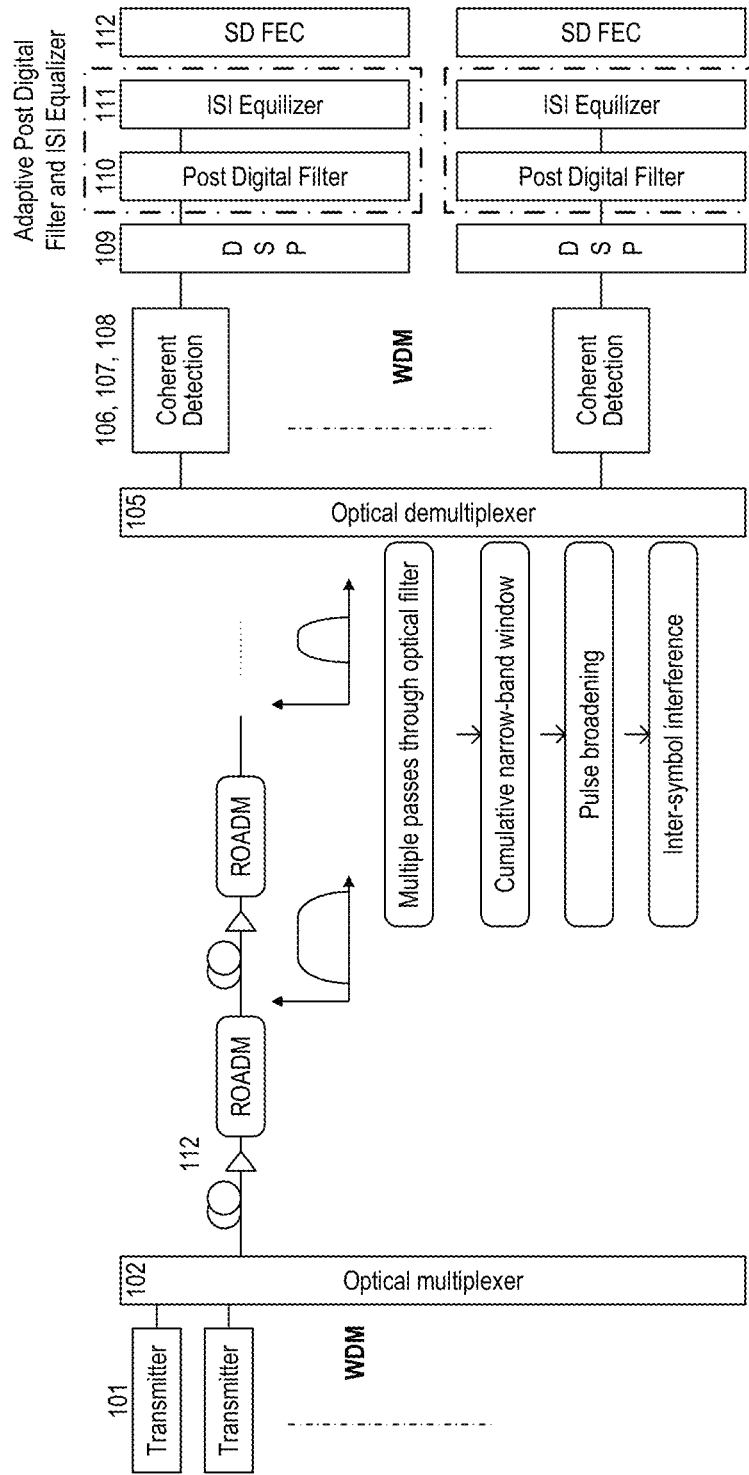
FIG. 2 is an example of a multiple cascaded ROADM (reconfigurable optical add-drop multiplexer) transmission system with coherent detection employing both post digital filter and ISI equalizer DSP module.

To facilitate ease of optical networking, tolerance to spectrally narrowed received signal is useful, as signal channel spacing is degraded after transmission through optical channel, especially when reconfigurable optical add/drop multiplexers (ROADMs) (112) nodes are used in the network as the second exemplary embodiment shown in FIG. 2. Spectrum narrowing may induce severe ISI between consecutively transmitted symbols.

Conventional DSP algorithm using adaptive decision feed forward equalizer may be an inefficient solution for ISI compensation in such cases, since this FIR filter may enhance noise during compensation of spectrum narrowing. In addition to the regular DSP in conventional coherent detection, additional post digital filter and ISI equalizer algorithm are used to suppress noise and crosstalk for optimum detection (110 and 111) in the channels with strong ISI impairment. To further improve the system performance, SD FEC is used by insertion of a suitable error correction code into a transmitted data stream to facilitate detection and correction of data errors.

Figure 3:
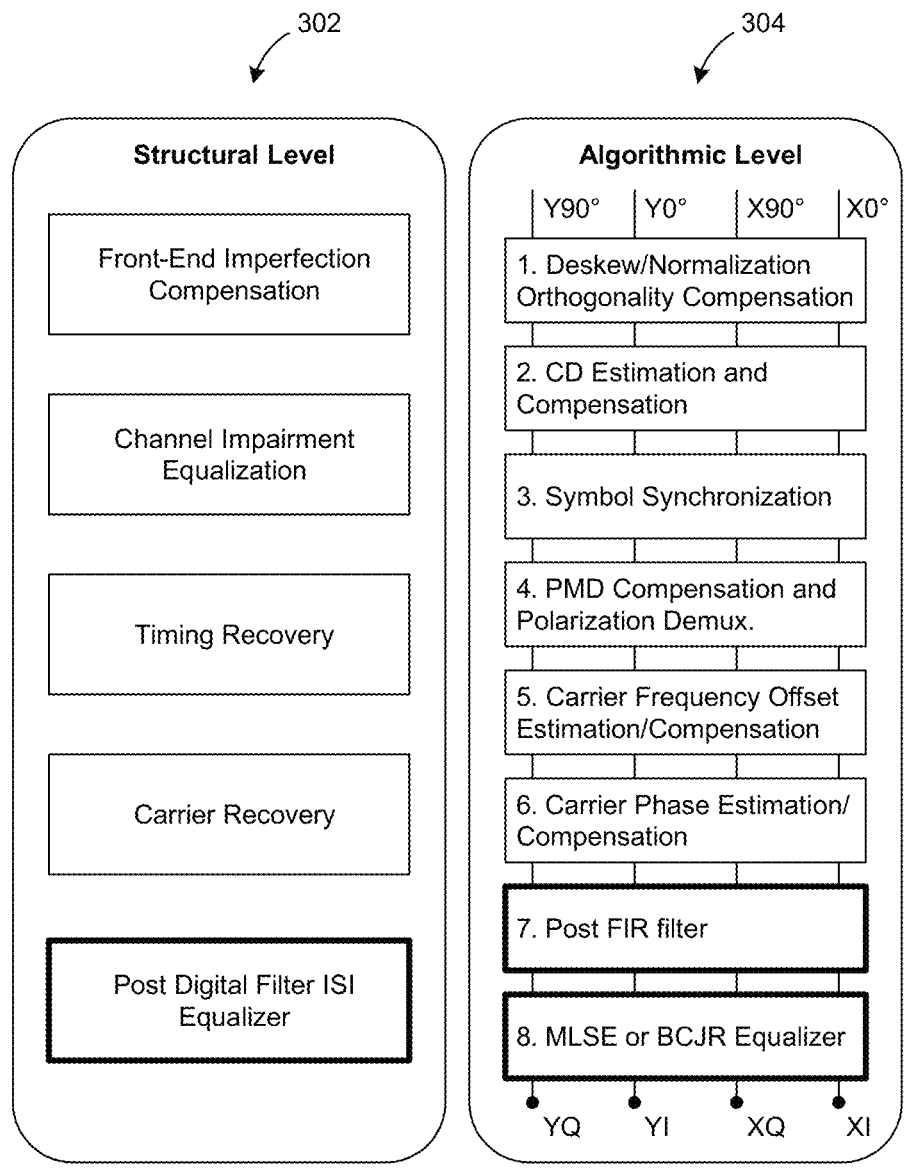
FIG. 3 is an example of a DSP process with the equalization towards ISI impairment.

An example embodiment of procedures performed by the DSP is shown in FIG. 3. Although the specific algorithms for each process block are typically different because there are various realizations of the same process block in the implementation level, the generic functions in the structural level or function abstractions are similar for all major commercial products. The various functional modules illustrated in FIG. 3 may be performed using DSP code, or may be performed using hardware-only or a combination of hardware and software.

As an example, the post digital filter (e.g., module 7 in 304) can be simply implemented by a two-tap or a three-tap FIR structure (e.g., delays and adders) with the impulse response in z-transform given by Equations (1) and (2) respectively $$H_{2tap}(z)=1+\alpha \cdot z^{-1} \tag{1}$$

$$H_{3tap}(z)=1+\alpha \cdot z^{-1}+\beta \cdot z^{-2} \tag{2}$$

In Equations 1 and 2, $\alpha$ and $\beta$ represent the adjustable filter (tap) coefficients. One reason the adaptively adjust the current value of α, or α and β is to approach the matched filter function of the whole link for SNR improvement.

Figure 4:
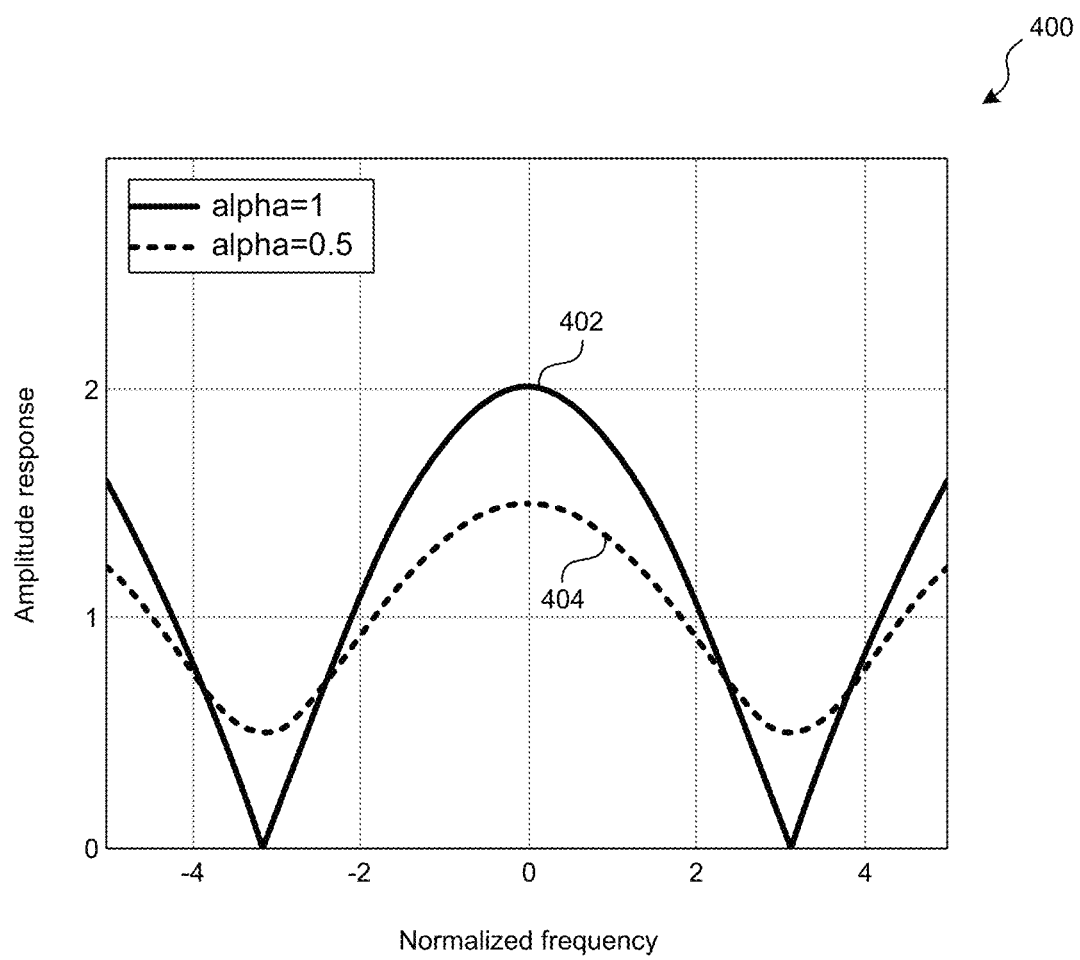
FIG. 4 shows an example of amplitude-frequency response for 2-tap post digital FIR (finite impulse response) filter with and without tap coefficient adjustment.
Figure 5:
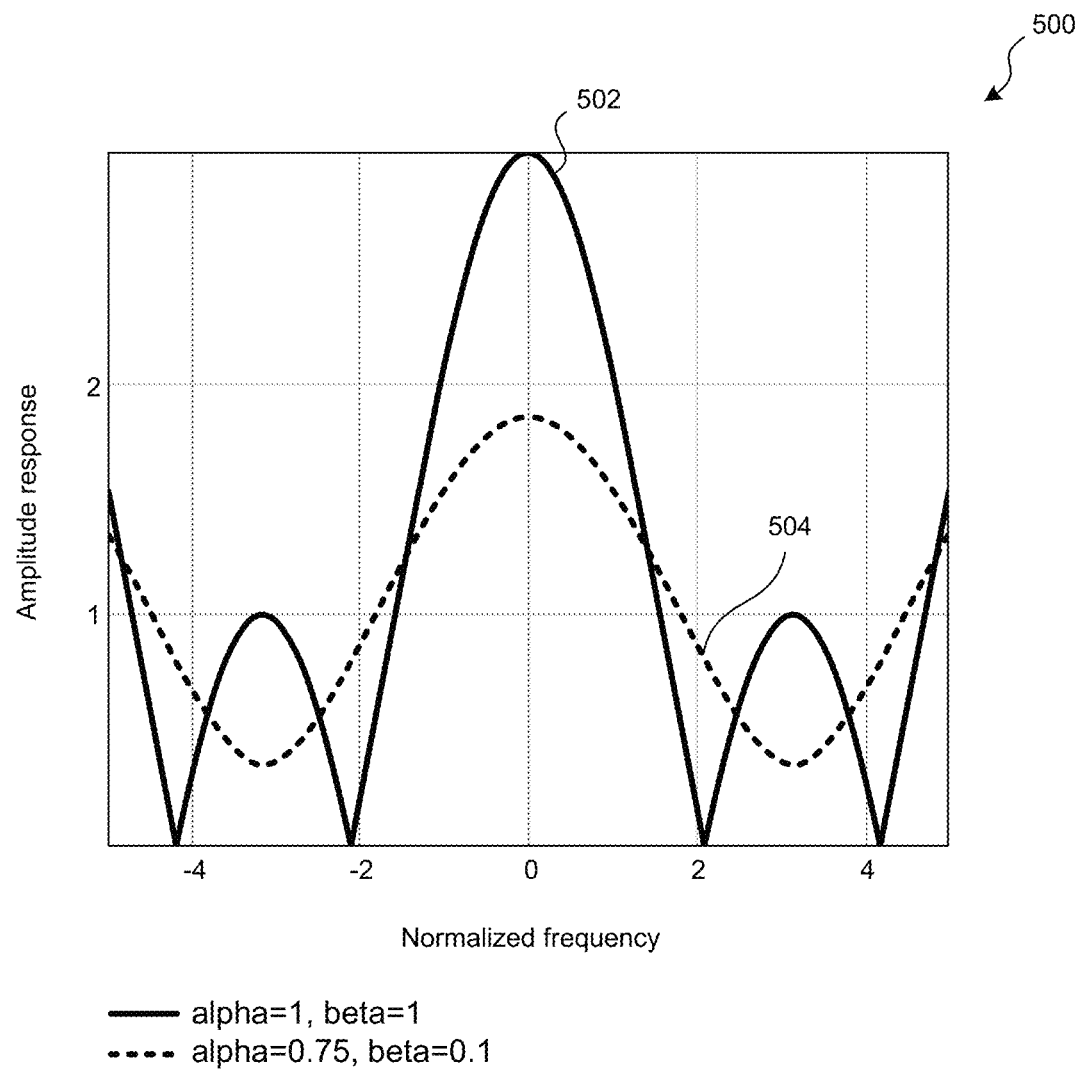
FIG. 5 shows an example of amplitude-frequency response for 3-tap post digital FIR filter w/ and w/o tap coefficient adjustment.

FIG. 4 and FIG. 5 show examples of different amplitude-frequency responses of FIR filters with the adjustment of tap coefficient for the 2-tap and 3-tap filters respectively. Curve 402 depicts frequency response for alpha=1 case (Eq. 1) and curve 404 depicts frequency response for alpha=0.5 case. Curve 502 represents frequency response for alpha=1, beta=1 case and curve 504 represents frequency response for alpha=0.75 and beta=0.1 case.

Figure 6:
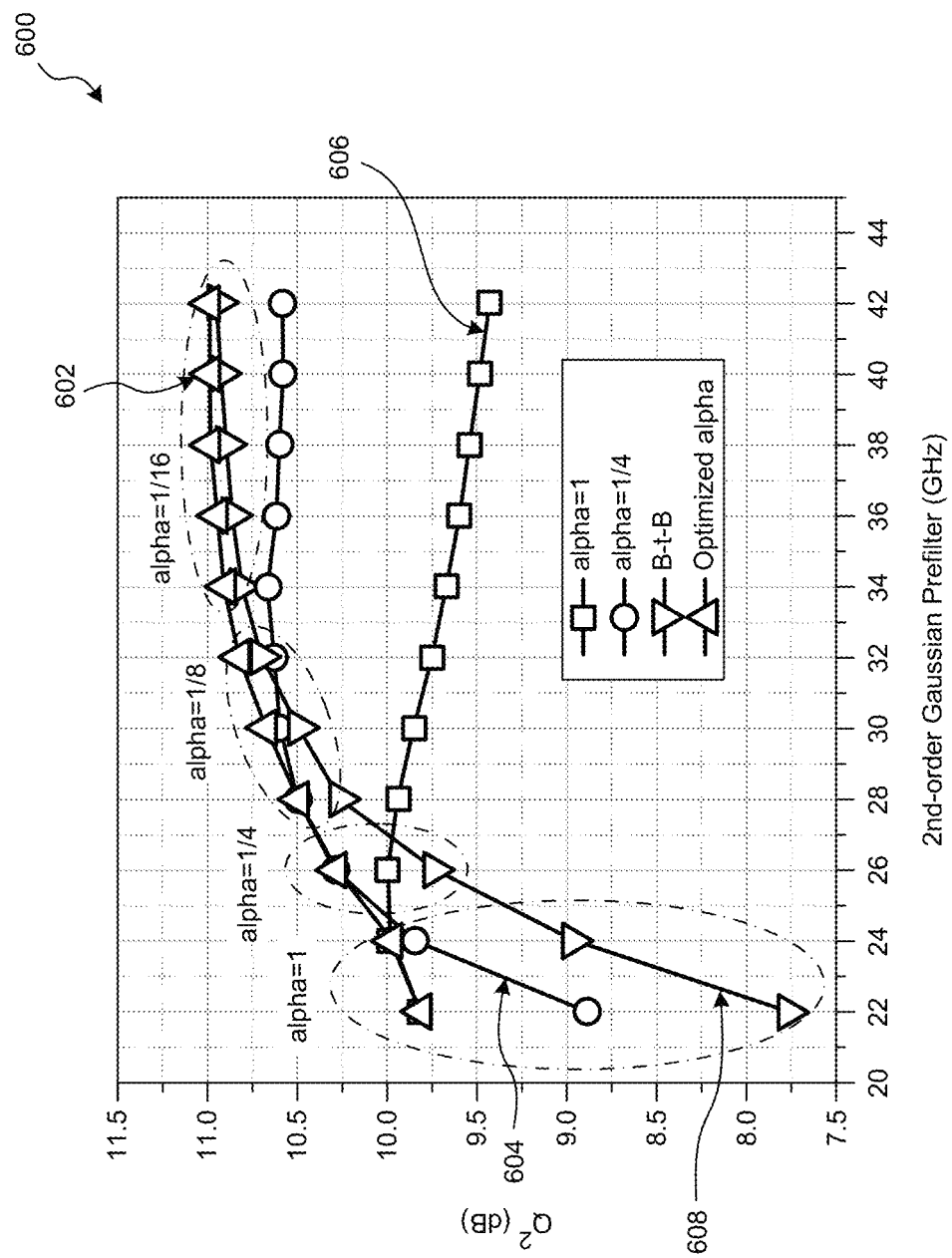
FIG. 6 shows examples of adjustable amplitude-frequency responses for optimal performance in the case of 2nd-order Gaussian prefiltering for various spectrum-narrowing channel conditions.

FIG. 6 shows the comparison results 600 with and without adjustment of tap coefficient for optimal performance in the case of $2^{nd}$-order Gaussian prefiltering for various spectrum-narrowing channel conditions with 15-dB OSNR. The example depicted in FIG. 6 is that for a 2-tap post digital filter and the subsequent MLSE for polarization division multiplexed quadrature phase shift keying (PDM-QPSK) signal. The depicted results are based on 32-G baud rate. The impairments of modulator distortion, frequency offset of 1 GHz, 100-kHz linewidth of Tx laser and LO are induced, errors are counted over 1 million bits, and OSNR is set at 0.1-nm resolution. A Q-value improvement of as much as 2 dB at 22-GHz channel bandwidth is achieved when compared with back-to-back (B-t-B) case 608. However, when the channel bandwidth reaches to 42 GHz, Q-value penalty as much as 1.5 dB is observed if the tap coefficient alpha maintains the value of 1 (curve 606). The curve 604 depicts performance with alpha is ¼. For various channel bandwidth conditions, the curve 602 represents the best performance with optimized adjustment of tap coefficients.

Figure 7:
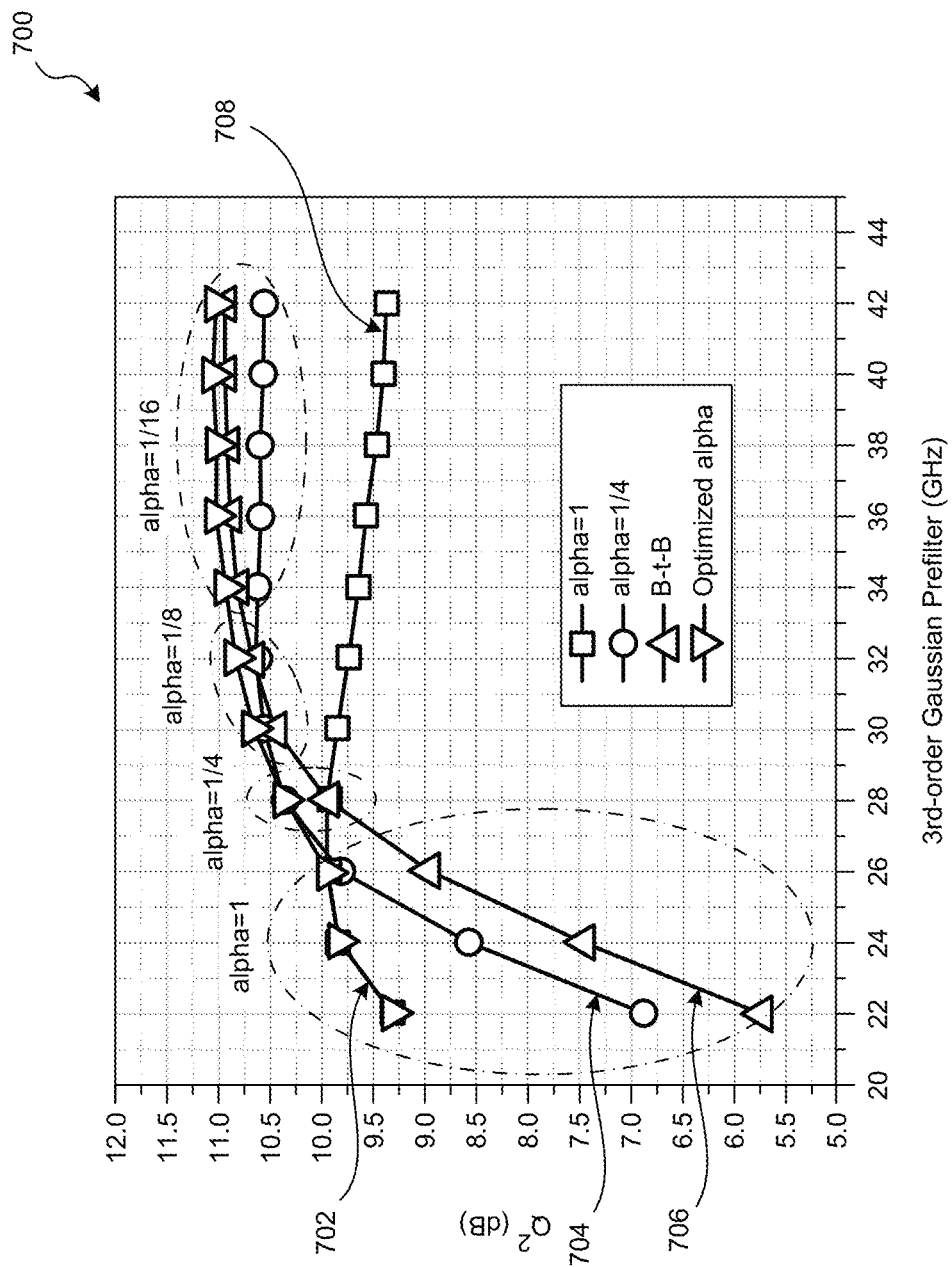
FIG. 7 shows examples of adjustable amplitude-frequency responses for optimal performance in the case of 3rd-order Gaussian prefiltering for various spectrum-narrowing channel conditions.

FIG. 7 shows the comparison results 700 with (702, 706) and without adjustment (704, 708) of tap coefficient for optimal performance in the case of $3^{rd}$-order Gaussian prefiltering for various spectrum-narrowing channel conditions with 15-dB OSNR. These results demonstrate the value of adjustment of tap coefficients for channel performance. For example both curves 702 and 706 demonstrate improvements of up to 1.5 dB at high GHz values compared to fixed alpha cases (alpha=1 and alpha=¼).

Figure 8:
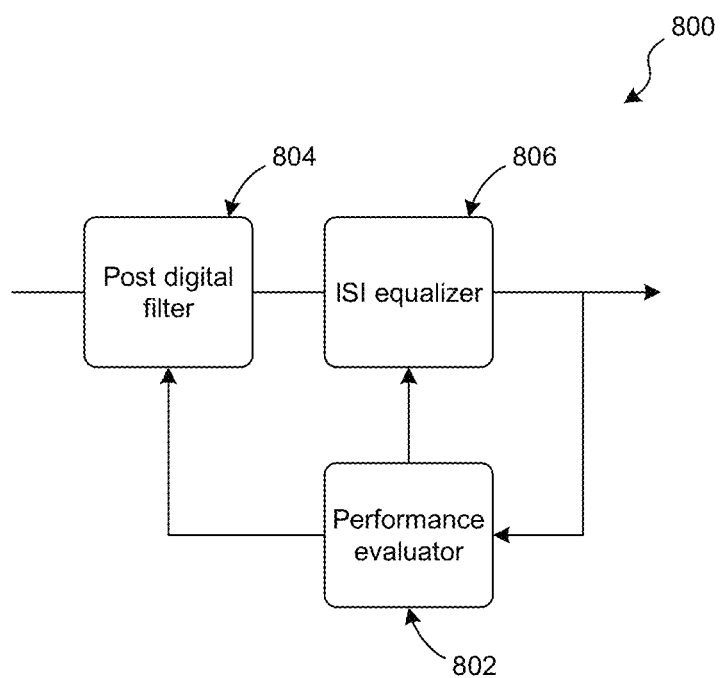
FIG. 8 shows an example structure of an adaptive post digital filter and the corresponding ISI equalizer subsystem.

To improve performance of the post digital filter and followed ISI equalizer by having an optimized impulse or frequency response for various spectrum-narrowing channel conditions, we devised a subsystem with an example structure 800 shown in FIG. 8. In the structure 800, a performance evaluator module 802 is added with post digital filter module 804 and an ISI equalizer module 806. The module 802 may include code run using an arithmetic logic unit and a comparison operation. The module 804 may be implemented using delay and adder or alternatively implemented in software. The module 806 may be implemented using a least squares of error iterative optimization technique, e.g., MLSE. A feed-back loop is introduced from the ISI equalizer module output into the performance evaluator 802. The performance evaluator 802 can take soft signal sample values output from the ISI equalizer 806, e.g., an MLSE module, and accumulate up statistical signal and calculate the number of statistical sample in certain region in the constellation map.

Figure 9:
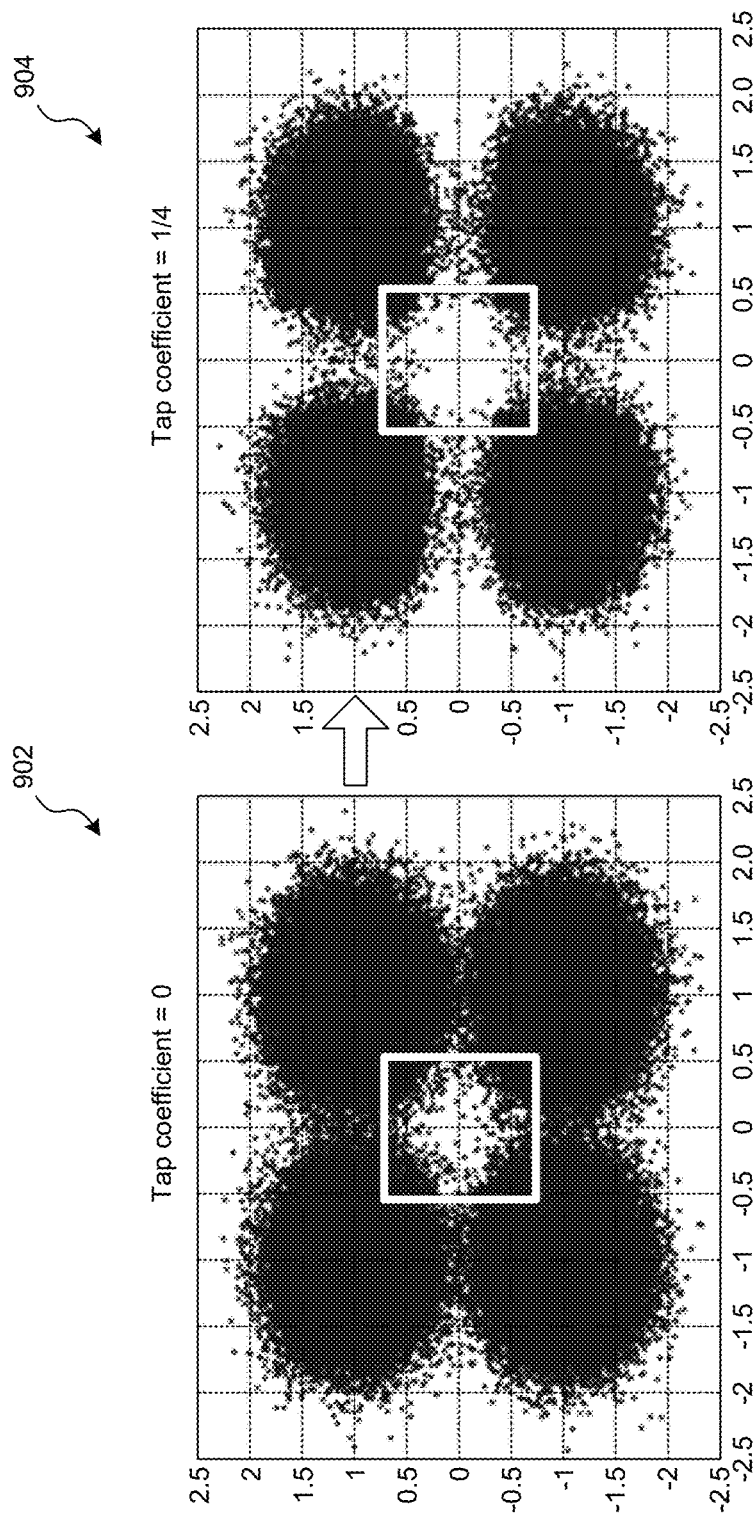
FIG. 9 shows an example of a performance evaluator criterion based on the calculation of the number of statistical sample in the region [−0.35, 0.35] in the constellation.
Figure 10:
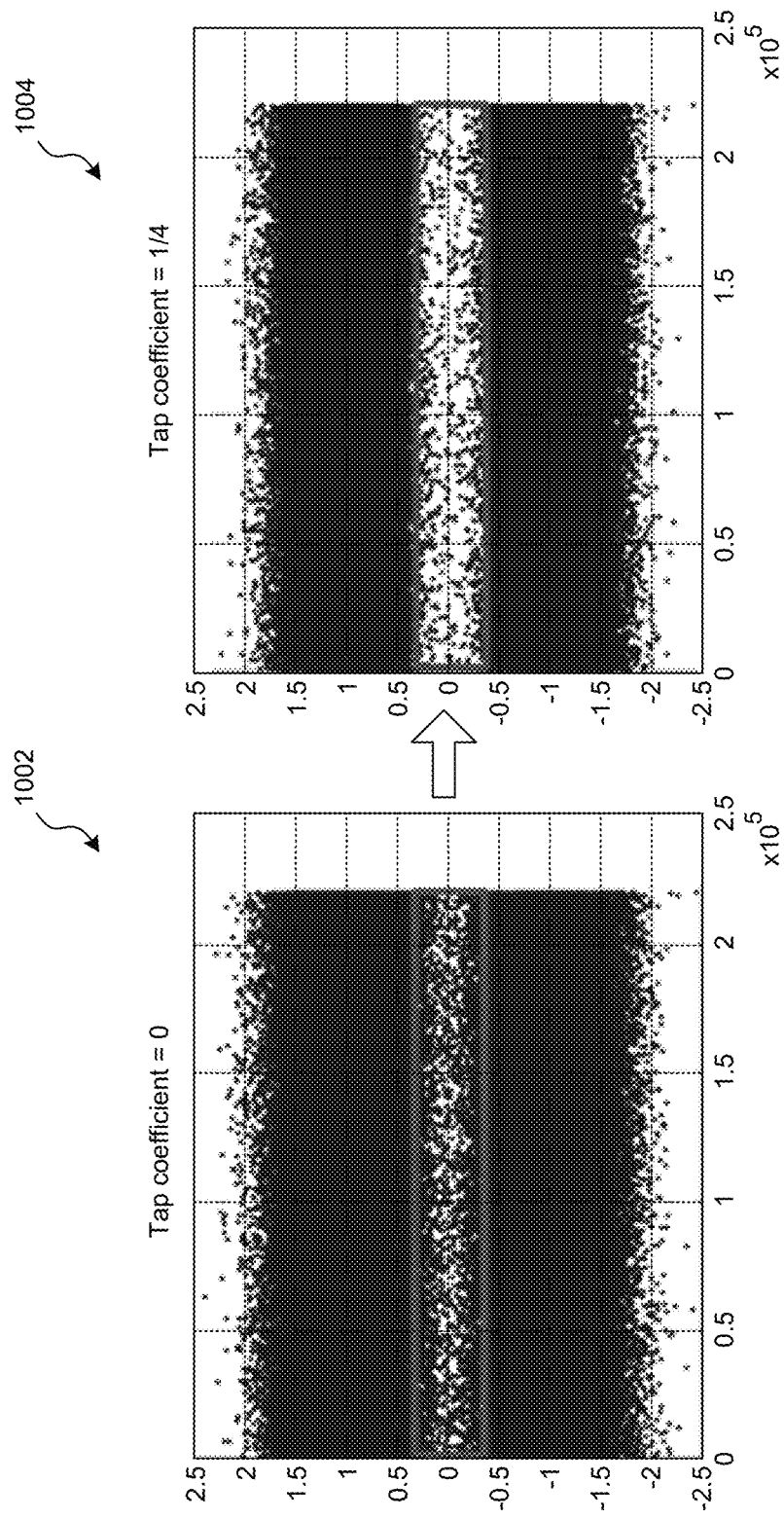
FIG. 10 shows an example of a performance evaluator criterion based on the calculation of the number of statistical sample in the region [−0.35, 0.35] for the real value of X polarization.

As an example, in the case of 26-GHz channel bandwidth with 15-dB OSNR for PDM-QPSK signals, FIGS. 9 and 10 show the performance using evaluator criterion based on the calculation of the number of statistical sample in the region [−0.35, 0.35] in the constellation or just real value of one polarization respectively. The post digital filter and ISI equalizer are based on 2-tap FIR filter with the subsequent MLSE algorithm. The graph 902 shows that a large number of symbol decisions fall within the smaller inset square, with alpha=0, and the graph 904 shows fewer symbol decisions falling in the smaller square region, when the tap coefficient value has been changed to ¼. A similar "cleaning up" of symbol decisions can be seen between graphs 1002 (alpha=0) and graph 1004 (alpha=¼).

Figure 11A:
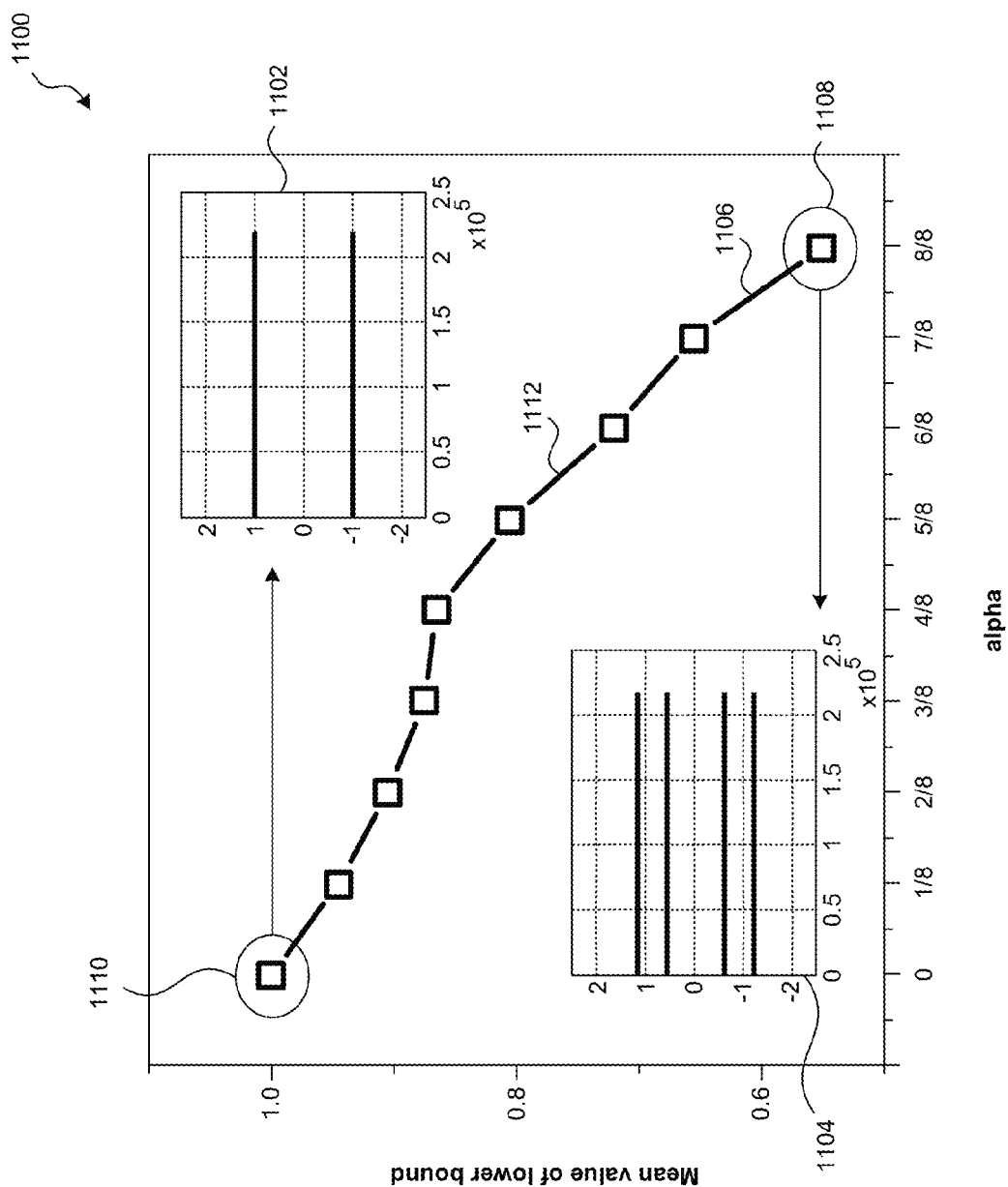
FIG. 11A depicts an example of a statistical region selection criterion for the upper bound as a function of post digital filter coefficient.

FIG. 11A illustrates an example of a statistical region selection criterion for the upper bound as a function of post digital filter coefficient.

Figure 11B:
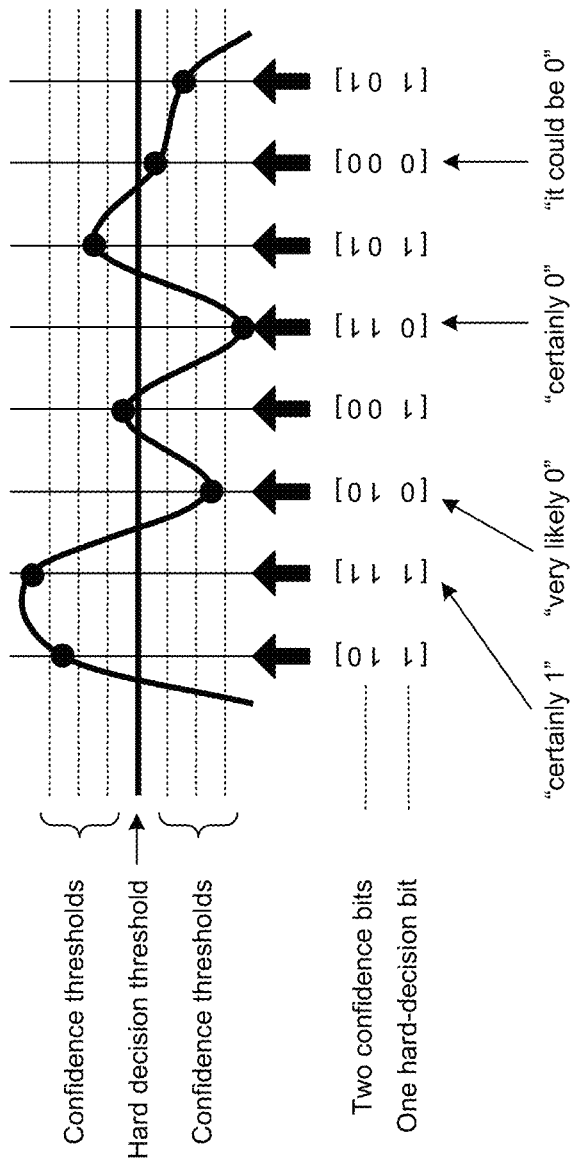
FIG. 11B depicts an example graph showing relationship between decision thresholds (hard or soft).

In the receiving scheme described in the present document, the selection of statistical region can be reconfigurable and a function of the tap coefficient (alpha). It should be smaller than the mean value of the lower bound of soft value output of MLSE. For a typical decision criterion, the region near the hard-decision threshold has higher probability of wrong decision as shown in FIG. 11B. The inventors performed simulations that show that the number of samples in statistical region is proportional to the bit error rate (BER). In some embodiments, the statistical region based on the hard-decision threshold can be selected as the mean, with the upper bound of this region being smaller than the lower bound of mean value of soft-value output of MLSE. In this case, the output of MLSE has two or four different distribution lines in this soft-value design as shown in FIG. 11A. Otherwise, a number of samples near to the lower bound of distribution line with high probability of correct decision will fall in the statistical region and the evaluation performance will be degraded.

Statistical region selection criterion for the upper bound is shown in FIG. 11B as a function of post digital filter coefficient. The lower bound of the statistical region selection is decided based on the operation coverage of the 15-25dB OSNR range in typical optical communication link. The insets 1102, 1104 show the signal amplitude distribution (soft value) in an ideal communication link (no any impairments) when the filter coefficient is chosen with alpha=0 (point 1110, inset 1102) and alpha=1 (point 1108, inset 1104) respectively.

From results presented in FIG. 11A, it can be seen that the mean value of signal amplitude at lower bound is around 1 when alpha=0 while the mean value is around 0.55 when alpha=1. The mean value of lower bound for other frequency response (with different alpha value of post digital filter) is somewhere in between 0.55 and 1, as indicated by curve 1112. Therefore, in some embodiments, the statistical region selection criterion can be based on all the regions smaller than 0.55 or optimally reconfigurable for different alpha selection. To further account for the 15-25 dB OSNR, the value could be selected to be 0.35.

The observation duration in the horizontal axis (horizontal axis as depicted in the insets 1102 and 1104) should be large enough to accurately reflect the statistical impact. For example, in some embodiments, larger than 0.1 million symbols is chosen, which corresponds to 10 us level in 100-Gb/s system. The region selection is independent on individual lane of each polarization and inphase and quadrature components because individual process of each lane (see, e.g., FIG. 3, vertical lines or lanes corresponding to XI, XQ, YI and YQ). Therefore, a square region can be used in the constellation diagram.

Figure 12:
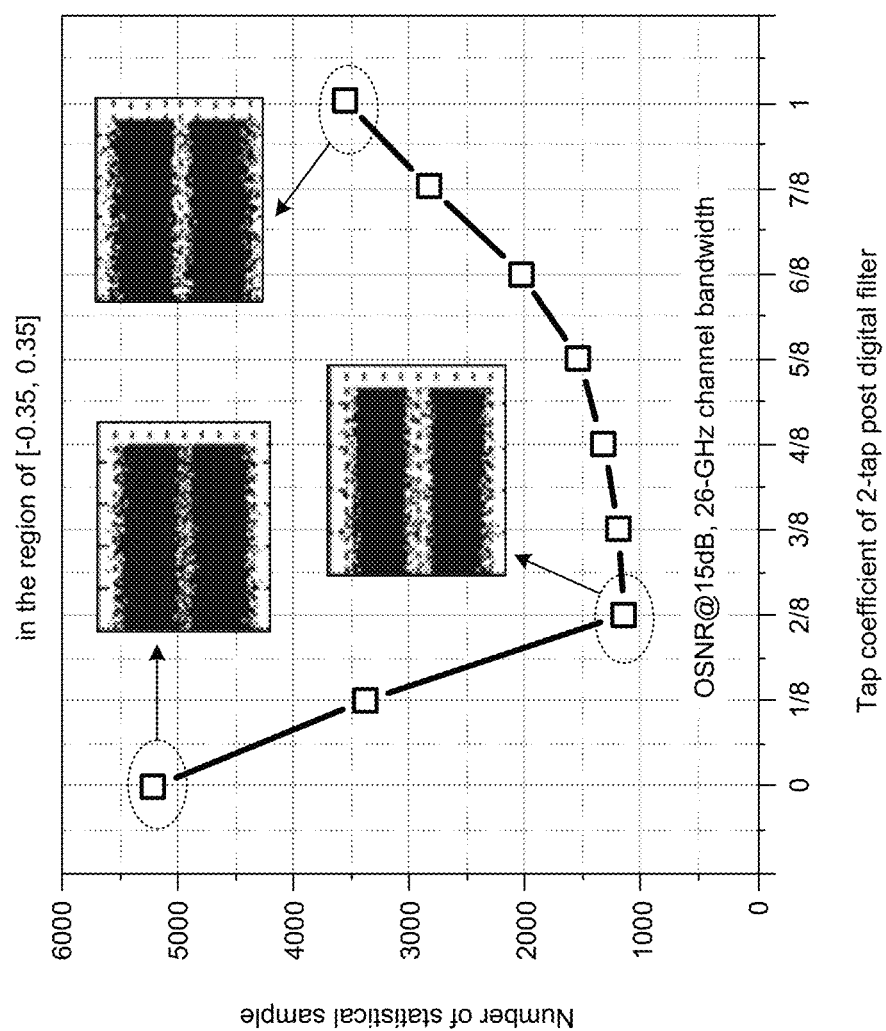
FIG. 12 depicts an example of performance results based on the calculation of the number of statistical sample for the real value of X polarization.

FIG. 12 depicts an example of performance results based on the calculation of the number of statistical sample for the real value of X polarization. In some experiments, we found out that the value of ⅔ is the optimal FIR filter shape in such channel condition, which matches the Q-value or BER results very well.

Based on the performance results, an optimal value of a filter coefficient can be estimated numerically or analytically. The estimated information is fed into the post digital filter 804 and the following ISI equalizer 806 for the optimal adjustment of the corresponding coefficients in such operation condition. The ISI equalizer 806 output can be fed back to the performance evaluator 802 to iteratively improve the adjustment accuracy.

The performance can also take hard value from ISI equalizer 806 to perform the BER calculation as the performance evaluation criterion. In such cases, the receiver uses the transmitter information for BER calculation (e.g., reference signals known a priori). The aforementioned use of soft value doesn't need this information about transmitted information.

Figure 14:
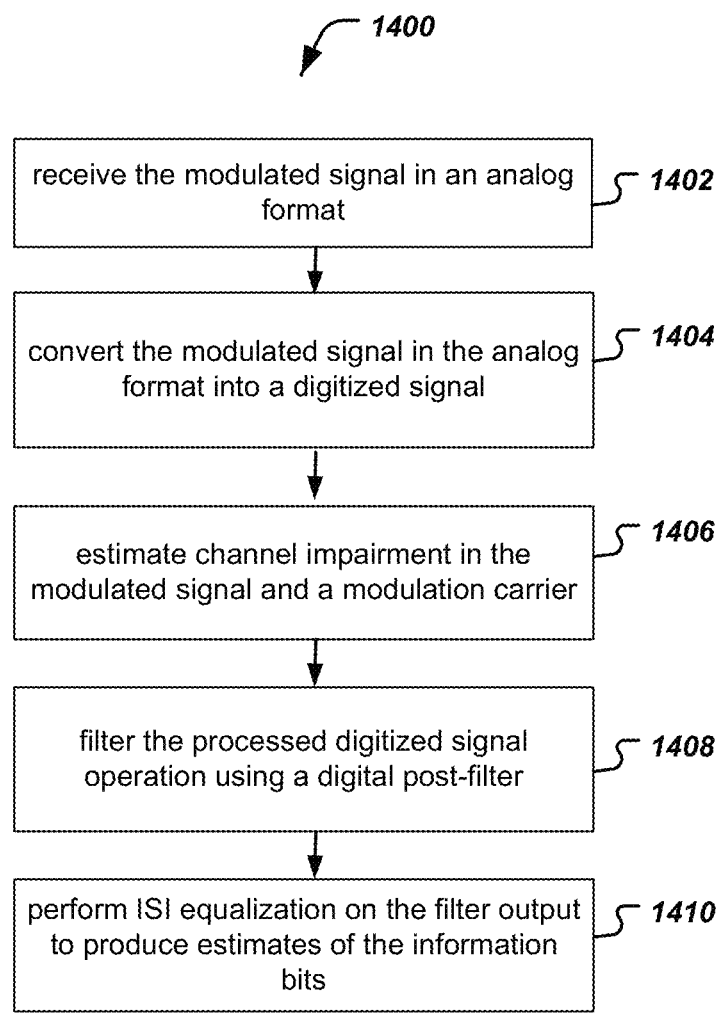
FIG. 14 is a flowchart example of a method of optical communication.

FIG. 14 illustrates a flowchart for an example method 1400 for recovering information bits from a modulated signal in which information bits are modulated using a coherent modulation technique. The information bits may represent, e.g., user data that is carried in a network. The method 1400 may be implemented at receiver-side of optical devices 1302, 1306.

The method 1400 includes, at 1402, receiving the modulated signal in an analog format. The signal in the analog format may be, e.g., a polarization domain multiplexed optical signal carried over an optical communication medium such as a glass or plastic fiber.

The method 1400 includes, at 1404, converting the modulated signal in the analog format into a digitized signal.

The method 1400 includes, at 1406, estimating, by processing the digitized signal, channel impairment in the modulated signal and a modulation carrier used for the coherent modulation technique.

The method 1400 includes, at 1308, filtering the processed digitized signal operation using a finite impulse response digital post-filter comprising a number of filter coefficients to generate a filter output. The digital post-filter may be, e.g., the digital post-filter 808 illustrated in FIG. 8.

The method 1400 includes, at 1410, performing inter-symbol-interference (ISI) equalization on the filter output to produce estimates of the information bits. The ISI equalization may be, e.g., as described with respect to module 806 in FIG. 8.

In some embodiments, the filter coefficients are adaptively adjusted using the estimates of timing information. For example, in some embodiments, an error criterion, such as minimum least square error, may be used to adjust filter coefficients by formulating them filter coefficients as a function of time, and using an adaptive step size to iteratively adjust filter coefficients to reduce timing error. In some embodiments, performance of the estimates of the information bits is evaluated. The performance may be based on, e.g., a match between the estimates and known values of information bits. The adaptively adjusting the filter coefficients comprises providing a feedback signal to change the filter coefficients to optimize the performance. In some embodiments, the evaluation of performance includes calculating an amount of samples of the filter output that fall within a constellation region of the coherent modulation technique. For example, as depicted in FIG. 9 or FIG. 10, and the number (e.g., percent) of decoded symbols that fall within the window may be constructed in the constellation domain. The size of the window may be fixed or may be changed based on system considerations such as the desired bit error rate, signal to noise ratio of the communication channel, etc.

In some embodiments, during the conversion of the digitized signals, polarization-domain demultiplexing to recover polarization-domain multiplexed components of the modulated signal in the analog format is performed. In some embodiments a two or three tap filter coefficient is used. In some embodiments, the method 1400 further includes, correcting errors in the estimates of the information bits based on an error correction code to produce recovered information bits. In some implementations, the performing ISI equalization includes estimating a received symbol using a maximum likelihood symbol estimation technique. In some embodiments, the BCJR algorithm may be used instead.

Figure 15:
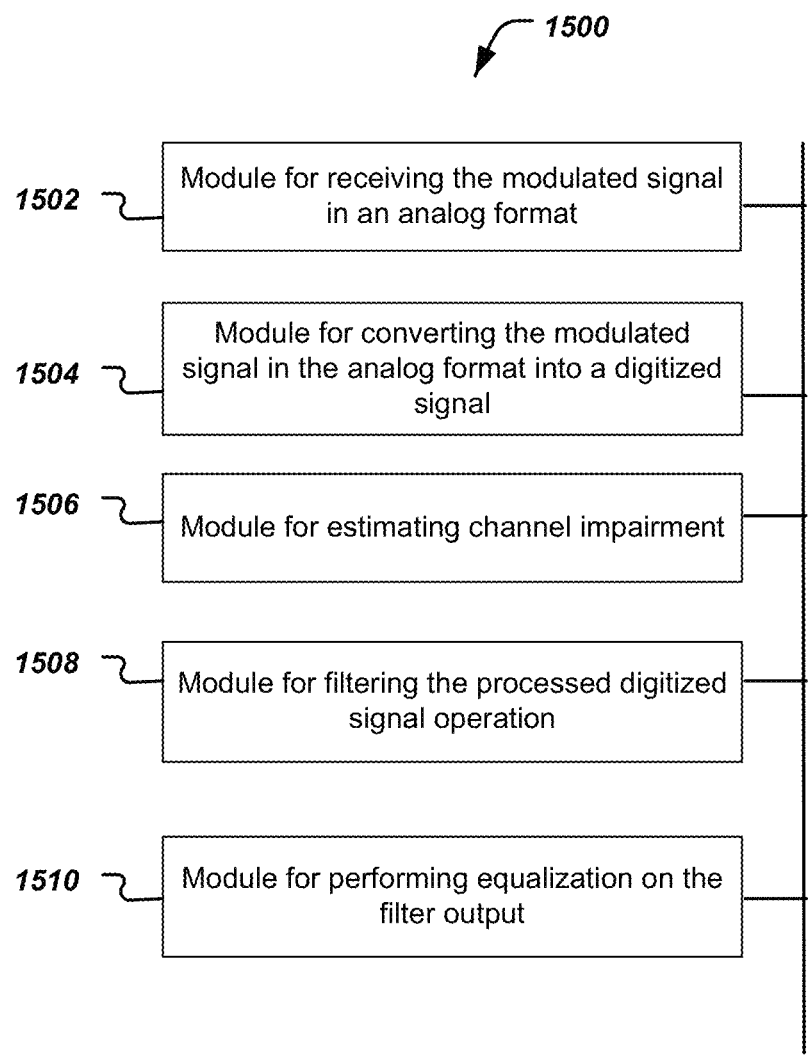
FIG. 15 is a block diagram of an example of an apparatus for optical communication.

FIG. 15 is a block diagram depiction of an example apparatus 1500 for recovering information bits from a modulated signal in which information bits are modulated using a coherent modulation technique. The apparatus 1500 includes a module 1502 (e.g., a radio frequency front end) that receives the modulated signal in an analog format. The apparatus 1500 includes a module 1504 (e.g., an analog-to-digital convertor) that converts the modulated signal in the analog format into a digitized signal. The apparatus 1500 includes a module 1506 (e.g., an estimator) that estimates, by processing the digitized signal, a channel impairment in the modulated signal and a modulation carrier used for the coherent modulation technique. The apparatus 1500 includes a module 1508 (e.g., a digital filter) that filters the processed digitized signal operation using a finite impulse response digital post-filter comprising a number of filter coefficients to generate a filter output. The apparatus 1500 includes a module 1510 (e.g., an inter-symbol-interference (ISI) equalizer) that performs equalization on the filter output to produce estimates of the information bits.

In some implementations, the apparatus 1500 further includes an adaptation module that calculates, using the estimates of the information bits, the filter coefficients. This task may be performed using a performance evaluation module that evaluates a performance of the estimates of the information bits, where the adaptively adjusting the filter coefficients comprises providing a feedback signal to change the filter coefficients to optimize the performance. In some embodiments, the performance evaluation module may include a performance estimation module that calculates an amount of samples of the filter output that fall within a constellation region of the coherent modulation technique.

In some embodiments, the analog to digital signal conversion may use a processing operation in which a polarization demultiplexer demultiplexes to recover polarization-domain multiplexed components of the modulated signal in the analog format. As previously shown in FIG. 4 and FIG. 3, in some embodiments, a 2 or 3 tap filter may be used. In some embodiments, the ISI equalization may be performed using MLSE or BCJR optimization technique.

In a BCJR technique, which stands for Bahl Cocke Jelinek Raviv technique, a sliding-window multilevel maximum a posteriori probability (MAP) equalizer may be used to decode codes and as a MAP detector.

In some embodiments, an optical communication system includes an optical signal transmitter, an optical transmission network (e.g., including a glass or plastic fiber) that can carry an optical signal and an optical signal receiver. The optical signal receiver is configured to receive, over the optical transmission medium, the modulated signal in the analog format, convert the modulated signal in the analog format into a digitized signal, estimate, by processing the digitized signal, a channel impairment in the modulated signal and a modulation carrier used for the coherent modulation technique, filter the processed digitized signal operation using a finite impulse response digital post-filter comprising a number of filter coefficients to generate a filter output, and perform inter-symbol-interference (ISI) equalization on the filter output to produce estimates of the information bits.

It will be appreciated that techniques that can be used to improve the performance of a digital communication receiver are disclosed. In one aspect, the disclosed techniques use a post filter that is operated upon a received, digitized modulated signal. The filter coefficients of the post filter can be adaptive and adjusted based on the calculations performed in the subsequent ISI equalization step.

It will further be appreciated that the disclosed techniques for adapting filter coefficients of the post filter can be operated without the need to have a priori knowledge of the transmitted signal (e.g., the use of a reference signal). A performance criterion may be used that simply uses statistics of decision for received symbols to successively improve the performance of the receiver.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method of recovering information bits from a modulated signal in which information bits are modulated using a coherent modulation technique, the method comprising:
   receiving the modulated signal in an analog format;
   converting the modulated signal in the analog format into a digitized signal;
   estimating, by processing the digitized signal, a channel impairment in the modulated signal and a modulation carrier used for the coherent modulation technique;
   filtering the processed digitized signal operation using a finite impulse response digital post-filter comprising a number of filter coefficients to generate a filter output; and
   performing inter-symbol-interference (ISI) equalization on the filter output to produce estimates of the information bits;

evaluating a performance of the estimates of the information bits; and
adaptively adjusting, using the estimates of the information bits, the filter coefficients by providing a feedback signal to change the filter coefficients to optimize the performance;
wherein the evaluating the performance includes:
calculating a number of samples of the filter output that fall within a predetermined window in a constellation map of the coherent modulation technique.

2. The method of claim 1, wherein the converting into the digitized signal includes:
performing polarization-domain demultiplexing to recover polarization-domain multiplexed components of the modulated signal in the analog format.

3. The method of claim 1, wherein the number of filter coefficients is two or three.

4. The method of claim 1, further including:
correcting errors in the estimates of the information bits based on an error correction code to produce recovered information bits.

5. The method of claim 1, wherein the performing ISI equalization includes estimating a received symbol using a maximum likelihood symbol estimation technique.

6. The method of claim 1, wherein the performing ISI equalization includes estimating a received symbol using a Bahl-Cocke-Jelinek-Raviv (BCJR) algorithm.

7. An apparatus for recovering information bits from a modulated signal in which information bits are modulated using a coherent modulation technique, the apparatus comprising:
a radio frequency front end that receives the modulated signal in an analog format;
an analog-to-digital convertor that converts the modulated signal in the analog format into a digitized signal;
an estimator that estimates, by processing the digitized signal, a channel impairment in the modulated signal and a modulation carrier used for the coherent modulation technique;
a filter that filters the processed digitized signal operation using a finite impulse response digital post-filter comprising a number of filter coefficients to generate a filter output; and
an inter-symbol-interference (ISI) equalizer that performs equalization on the filter output to produce estimates of the information bits;
a performance evaluation module that evaluates a performance of the estimates of the information bits; and
an adaptation module that calculates, using the estimates of the information bits, the filter coefficients by providing a feedback signal to change the filter coefficients to optimize the performance;
wherein the performance evaluation module includes:
a performance estimation module that calculates an amount of samples of the filter output that fall within a predetermined window in a constellation map of the coherent modulation technique.

8. The apparatus of claim 7, wherein the converting into a digitized signal includes:
a polarization demultiplexer that polarization-domain demultiplexes to recover polarization-domain multiplexed components of the modulated signal in the analog format.

9. The apparatus of claim 7, wherein the number of filter coefficients is two or three.

10. The apparatus of claim 7, further including:
an error-correction module that corrects errors in the estimates of the information bits based on an error correction code to produce recovered information bits.

11. The apparatus of claim 7, wherein the ISI equalizer includes an MLSE module that estimates a received symbol using a maximum likelihood symbol estimation technique.

12. The apparatus of claim 7, wherein the ISI equalizer includes a module that implements a Bahl-Cocke-Jelinek-Raviv (BCJR) algorithm.

13. An optical communication system comprising:
an optical signal transmitter that produces an optical signal in an analog format comprising information bits using a coherent modulation technique;
an optical transmission network that carries the optical signal; and
an optical signal receiver to:
receive, via the optical transmission network, the modulated signal in the analog format;
convert the modulated signal in the analog format into a digitized signal;
estimate, by processing the digitized signal, a channel impairment in the modulated signal and a modulation carrier used for the coherent modulation technique;
filter the processed digitized signal operation using a finite impulse response digital post-filter comprising a number of filter coefficients to generate a filter output;
perform inter-symbol-interference (ISI) equalization on the filter output to produce estimates of the information bits;
evaluate a performance of the estimates of the information bits; and
adaptively adjust, using the estimates of the information bits, the filter coefficients by providing a feedback signal to change the filter coefficients to optimize the performance;
wherein the evaluating the performance includes:
calculating an amount of samples of the filter output that within a predetermined window in a constellation map of the coherent modulation technique.

14. The system of claim 13, wherein the optical signal receiver is further configured to adaptively adjust, using the estimates of the information bits, the filter coefficients.

15. The system of claim 13, wherein the converting into the digitized signal includes:
performing polarization-domain demultiplexing to recover polarization-domain multiplexed components of the modulated signal in the analog format.

16. The system of claim 13, wherein the optical signal receiver further performs:
correcting errors in the estimates of the information bits based on an error correction code to produce recovered information bits.

17. The system of claim 13, wherein the performing ISI equalization includes estimating a received symbol using a maximum likelihood symbol estimation technique.

18. The system of claim 13, wherein the performing ISI equalization includes estimating a received symbol using a Bahl-Cocke-Jelinek-Raviv (BCJR) algorithm.

* * * * *